United States Patent
Kumar et al.

(10) Patent No.: US 7,835,520 B2
(45) Date of Patent: Nov. 16, 2010

(54) UNIQUE IDENTIFIER PER CHIP FOR DIGITAL AUDIO/VIDEO DATA ENCRYPTION/DECRYPTION IN PERSONAL VIDEO RECORDERS

(75) Inventors: Nishit Kumar, San Jose, CA (US); David Auld, San Jose, CA (US)

(73) Assignee: Zoran Corporation, Sunnyvale, CA (US)

( * ) Notice: Subject to any disclaimer, the term of this patent is extended or adjusted under 35 U.S.C. 154(b) by 948 days.

(21) Appl. No.: 10/371,313

(22) Filed: Feb. 20, 2003

(65) Prior Publication Data
US 2004/0165725 A1   Aug. 26, 2004

(51) Int. Cl.
*H04N 7/167* (2006.01)
(52) U.S. Cl. .......................... 380/202; 726/27
(58) Field of Classification Search .......... 726/27, 726/26; 713/193, 192; 380/202
See application file for complete search history.

(56) References Cited

U.S. PATENT DOCUMENTS

| | | | |
|---|---|---|---|
| 5,222,133 A * | 6/1993 | Chou et al. | 705/55 |
| 5,416,840 A * | 5/1995 | Cane et al. | 705/52 |
| 5,563,950 A | 10/1996 | Easter et al. | |
| 5,590,192 A * | 12/1996 | Lovett et al. | 705/51 |
| 5,652,838 A * | 7/1997 | Lovett et al. | 726/30 |
| 5,706,292 A * | 1/1998 | Merritt | 714/710 |
| 5,719,943 A * | 2/1998 | Amada et al. | 380/202 |
| 5,742,512 A * | 4/1998 | Edge et al. | 702/57 |
| 5,768,382 A * | 6/1998 | Schneier et al. | 380/251 |
| 5,784,459 A | 7/1998 | Devarakonda et al. | |
| 5,799,080 A * | 8/1998 | Padmanabhan et al. | 713/193 |
| 5,881,155 A | 3/1999 | Rigal | |
| 5,896,499 A * | 4/1999 | McKelvey | 726/11 |
| 5,933,497 A * | 8/1999 | Beetcher et al. | 705/59 |
| 5,937,395 A * | 8/1999 | Iwamura | 705/30 |
| 5,970,143 A * | 10/1999 | Schneier et al. | 713/181 |
| 6,061,451 A * | 5/2000 | Muratani et al. | 380/201 |
| 6,067,622 A * | 5/2000 | Moore | 726/31 |
| 6,219,157 B1 * | 4/2001 | Shikakura et al. | 358/426.04 |
| 6,347,846 B1 | 2/2002 | Nakamura | |
| 6,647,328 B2 * | 11/2003 | Walker | 701/36 |

(Continued)

FOREIGN PATENT DOCUMENTS

EP   1253740   10/2002

(Continued)

OTHER PUBLICATIONS

Analog Devices, ADSP-2141L Data Sheet, Jan. 20, 2000.

(Continued)

*Primary Examiner*—David García Cervetti
(74) *Attorney, Agent, or Firm*—Frommer Lawrence & Haug LLP; John W. Branch

(57) ABSTRACT

The invention provides techniques to implement unique identifier for an integrated chip and how this ID can be employed to enhance the security of content in personal video recorder type systems. The storage device can be a hard disk, a removable storage medium or any other type of storage medium. An integrated circuit (IC) within the personal video recorder stores a unique identifier that is used in for encryption and decryption of data stored on the storage device. Several embodiments are disclosed herein that maintain the secrecy of the unique ID such that it is not easily accessible thereby defeating the security scheme.

27 Claims, 9 Drawing Sheets

U.S. PATENT DOCUMENTS

| | | | | |
|---|---|---|---|---|
| 6,799,277 | B2 * | 9/2004 | Colvin | 726/22 |
| 6,914,637 | B1 * | 7/2005 | Wolf et al. | 348/473 |
| 6,986,063 | B2 * | 1/2006 | Colvin | 726/28 |
| 6,986,150 | B2 * | 1/2006 | Spruit et al. | 720/718 |
| 6,993,137 | B2 * | 1/2006 | Fransdonk | 380/279 |
| 7,080,039 | B1 * | 7/2006 | Marsh | 705/51 |
| 7,107,458 | B2 * | 9/2006 | Oishi et al. | 713/189 |
| 7,107,462 | B2 * | 9/2006 | Fransdonk | 713/193 |
| 7,124,938 | B1 * | 10/2006 | Marsh | 235/382 |
| 7,174,568 | B2 * | 2/2007 | Chatani et al. | 726/27 |
| 7,228,427 | B2 * | 6/2007 | Fransdonk | 713/176 |
| 7,228,567 | B2 * | 6/2007 | Serkowski et al. | 726/30 |
| 7,237,255 | B2 * | 6/2007 | Fransdonk | 726/3 |
| 7,246,246 | B2 * | 7/2007 | Kupka et al. | 713/189 |
| 7,313,828 | B2 * | 12/2007 | Holopainen | 726/29 |
| 7,404,084 | B2 * | 7/2008 | Fransdonk | 713/176 |
| 7,664,709 | B2 * | 2/2010 | Chatani et al. | 705/59 |
| 2001/0030932 | A1 * | 10/2001 | Spruit et al. | 369/275.2 |
| 2001/0034712 | A1 * | 10/2001 | Colvin | 705/52 |
| 2001/0051928 | A1 * | 12/2001 | Brody | 705/52 |
| 2001/0051996 | A1 * | 12/2001 | Cooper et al. | 709/217 |
| 2002/0010863 | A1 * | 1/2002 | Mankefors | 713/189 |
| 2002/0053082 | A1 * | 5/2002 | Weaver et al. | 725/46 |
| 2002/0064188 | A1 * | 5/2002 | Mizobata | 370/535 |
| 2002/0080960 | A1 * | 6/2002 | Kanayama et al. | 380/201 |
| 2002/0104019 | A1 * | 8/2002 | Chatani et al. | 713/201 |
| 2003/0046566 | A1 * | 3/2003 | Holopainen | 713/193 |
| 2003/0098911 | A1 * | 5/2003 | Fujii et al. | 348/192 |
| 2003/0110375 | A1 * | 6/2003 | Colvin | 713/156 |
| 2003/0163712 | A1 * | 8/2003 | LaMothe et al. | 713/189 |
| 2003/0204738 | A1 * | 10/2003 | Morgan | 713/194 |
| 2004/0025038 | A1 * | 2/2004 | Eiserling et al. | 713/193 |
| 2004/0034775 | A1 * | 2/2004 | Desjardins et al. | 713/170 |
| 2004/0034785 | A1 * | 2/2004 | Tai et al. | 713/189 |
| 2004/0044631 | A1 * | 3/2004 | Walker et al. | 705/59 |
| 2004/0044901 | A1 * | 3/2004 | Serkowski et al. | 713/200 |
| 2004/0068648 | A1 * | 4/2004 | Lewis et al. | 713/153 |
| 2004/0165725 | A1 * | 8/2004 | Kumar et al. | 380/202 |
| 2005/0100161 | A1 * | 5/2005 | Husemann et al. | 380/200 |
| 2005/0264472 | A1 * | 12/2005 | Rast | 345/30 |

FOREIGN PATENT DOCUMENTS

| | | |
|---|---|---|
| WO | WO 01/93000 A2 | 12/2001 |
| WO | 0229565 | 4/2002 |
| WO | WO 02/102075 A1 | 12/2002 |

OTHER PUBLICATIONS

PCT International Search Report for international application No. PCT/US04/005121, mailed Nov. 18, 2004.

A Communication, dated Jun. 20, 2008, for European Application No. 04713370.7.

* cited by examiner

UNIQUE IDENTIFIER PER CHIP FOR DIGITAL AUDIO/VIDEO DATA ENCRYPTION/DECRYPTION IN PERSONAL VIDEO RECORDERS

FIELD

The invention relates to techniques of implementing a unique identifier for individual integrated circuit chips for use in data encryption and decryption. The disclosure describes use of a unique identifier to increase the security of content to be stored on long-term storage media in a personal video recorder type system.

BACKGROUND

When audio/video data is processed by various circuits and components that provide functionality in a personal video recorder type system, some or al of the data is typically stored on a long-term storage device such as a hard disk. In order to provide copyright and licensing protection, it is desirable to provide encryption to protect the data from unauthorized copying and use. Typically, standard algorithms for data scrambling are used so that the security strength of the algorithm is well know and widely accepted. It is therefore the key(s) used by these algorithms that largely govern the security level of the whole system.

One common encryption algorithm is the Data Encryption Standard (DES, or Single-DES). However, Single-DES can be "cracked" within a few hours using commonly available computing resources. A further refinement referred to as Triple-DES provides significant strength improvement (a factor of $2^{56}$). See, for example, Kaufman, Perlman and Speciner "*Network Security*," Ch. 3, page 63, March, 1995 by Prentice Hall. Another well-known encryption algorithm is the Advanced Encryption System (AES). See, for example, Elaine Barker "*NIST Cryptographic Toolkit*", published Oct. 16, 2000.

The hardware (e.g., integrated circuit) implementation of standard cryptographic algorithms is well known. However, in many situations, for example, personal vide recording, each system must be uniquely distinguishable so that data written to the storage device of a system cannot be copied and used by another system, that may or may not be authorized. In other words, it is desirable that each system encrypt the data stored by that system with a key that is different from other systems. Furthermore, such unique keys can also be used to encrypt and protect movement of shared/public/group keys outside of an integrated circuit.

The unique key or ID must be securely stored either on the integrated circuit or on a secure device outside the integrated circuit. If the key is stored on an external device a secure transfer between the device and the integrated circuit performing the cryptographic operations must be provided.

In general, keys that are used to encrypt content to be stored on long-term and/or removable storage devices require a higher degree of protection. This is because, unlike broadcast communication scrambling systems, these keys do not change as often with time. Such keys are typically used for the life of the system or a session of the system. Architectures in which keys change over time require that the key be stored, typically on an external memory device. It is this memory that then becomes the weak point of the system.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for secure storage of audio/video content in a personal audio/video recorder-type system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The invention provides techniques for storing content securely in personal video recorder type systems. The storage device can be a hard disk, a removable storage medium, or any other type of storage medium. The integrated circuit (IC) to interface with the storage device uses a unique ID to encrypt or decrypt the content. Several embodiments are disclosed herein that maintain the secrecy of the unique ID such that is not easily accessible thereby defeating the encryption scheme.

Figure 1:
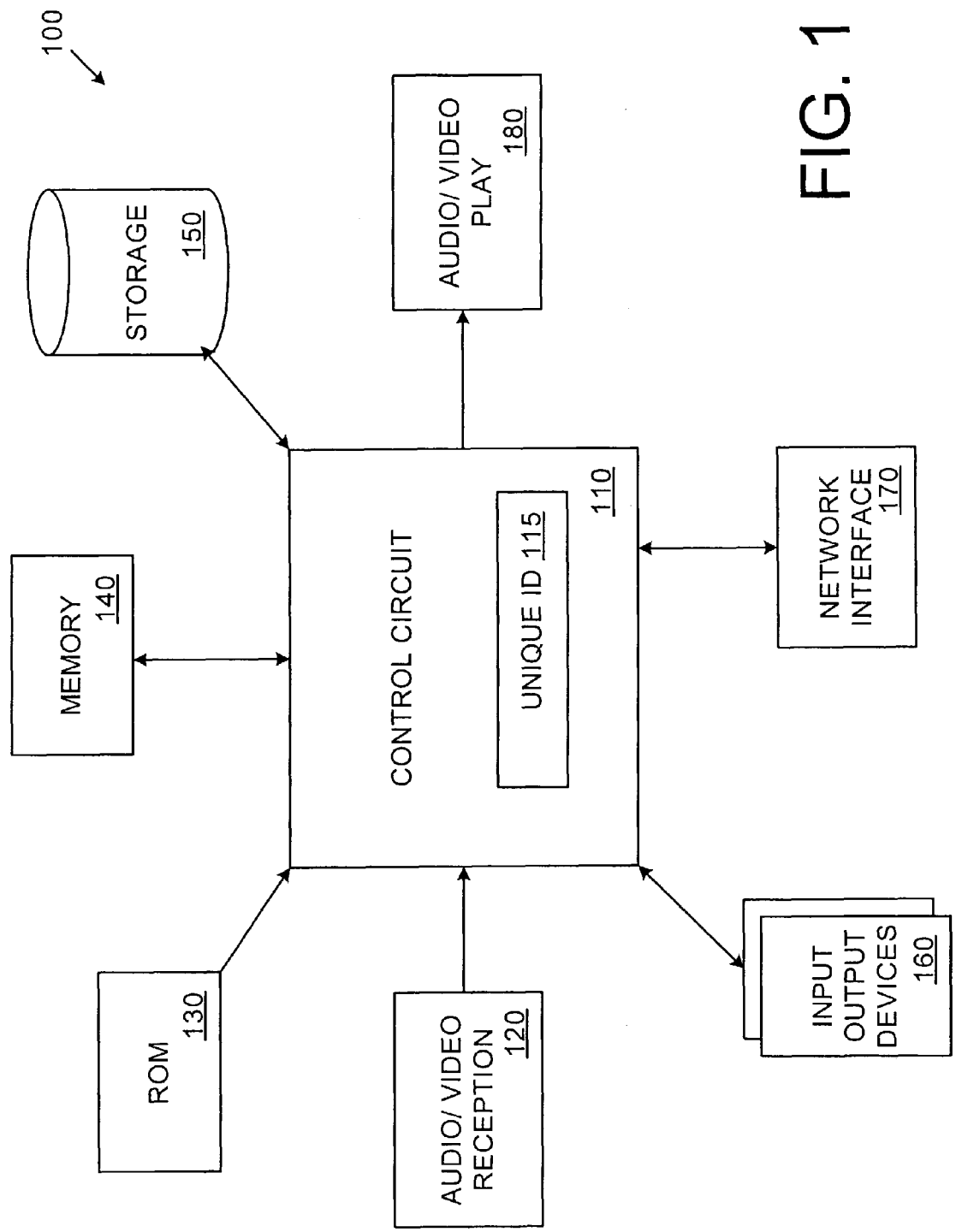
FIG. 1 is one embodiment of an audio/video system in which the unique identifier (ID) can be used.

FIG. 1 is a block diagram of a basic audio/video system. The system of FIG. 1 can be, for example, an audio/video recorder-type system. Audio/video (A/V) system 100 can allow user to record and playback audio/video data transmitted as television broadcasts, radio broadcasts, satellite broadcasts, video-on demand, etc.

A/V system 100 includes processing, storage, and communication devices that provide audio/video reception, playback, audio/video data processing, and data storage functionality. A/V system 100 includes control circuit 110 to control data flow and to provide necessary interfaces to communicate with other devices/components. In one embodiment, control circuit 110 is an application specific integrated circuit (ASIC); however, in other embodiments, control circuit can be implemented as multiple integrated circuits and/or can be a general-purpose control circuit. The processing capabilities of control circuit 110 generally include transport data decryption, program de-multiplexing, MPEG/DV decoding, video scaling, graphics functions, blending, color space and format conversion, audio mixing and cross-fading, and content encryption/decryption.

A/V system 100 includes audio/video reception device 120 that provides compressed or uncompressed audio/video data stream to control circuit 110. The A/V reception device 120 can include, but is not limited to, satellite/terrestrial tuners, IEEE 1394 devices, audio/video decoder devices, etc. Control circuit 110 provides the output signals to A/V play device 190 which can be a high-definition or NTSC/PAL television, a monitor, or any other type of device capable of displaying video and playing audio.

A/V system 100 includes read-only memory (ROM) 130 (or other static storage device) to store static information and instructions. This, for example, could be instructions required for booting up system 100 and initialize the components to their proper state and configuration. A/V system 100 further includes memory 140 to store transient information and instructions to be executed by control circuit 110 or any other component of system 100. Memory 140 can also be used to store temporary variables of other intermediate information generated by control circuit 110 in processing audio/video data. Memory 140 can be any type of dynamic memory known in the art e.g., SDRAM or DDR.

Control circuit 110 may also be coupled to, or provide an interface for, input/ouput devices 160. Input/output devices 160 can include, but are not limited to, smart cards (e.g., for user entitlement control functions), infrared control devices (e.g., remote controls), and other storage and processing devices that can be controlled by standard interfaces (e.g., general purpose input/output (GPIO), local bus I$^2$C), In order to facilitate content sharing, A/V system 100 can also include network interface 170. Network interface 170 can be any type of network interface (e.g., PCI bus, USB) that allows additional media to provide a source of audio/video data stream to the control circuit 110.

Storage device 150 is used to store audio/video content that is processed by control circuit 110 and can be any storage device know in the art, for example, magnetic disks or optical discs with corresponding drives. As described in greater detail below, storage device 150 is used to store audio/video content for delayed playback. In the embodiment of FIG. 1, while both memory 140 is only transient. On the other hand, the life of content stored storage device 150 is considerably longer.

Control circuit 110 uses unique ID 115 to encrypt data to be send to storage device 150 for long-term storage. Various embodiments and techniques for implementing unique ID 115 are described in greater detail below.

In one embodiment, control circuit 110 includes an implementation of a Triple DES or AES encryption/decryption algorithm. The key used for the encryption/decryption operations is a 128-bit key stored unique ID 115. Other key lengths can also be used. Control circuit 110 can use the unique ID 115 itself as the key value in the encryption operations and causes encrypted data to be stored on the storage device 150. Whenever required encrypted data retrieved from storage device 150 is decrypted using the unique ID 115.

Figure 2A:
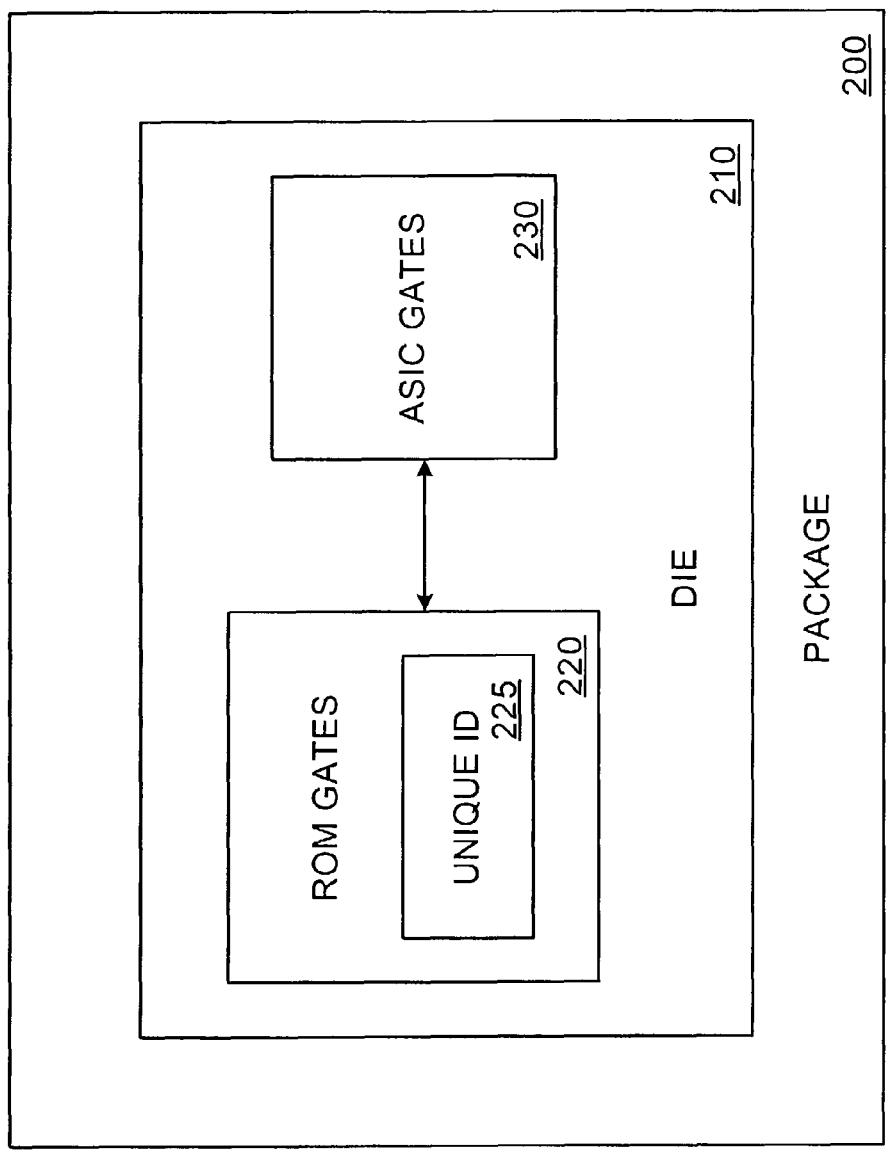
FIG. 2a is a block diagram of an integrated circuit and a read-only memory (ROM) to store a unique ID on a common die.

FIG. 2a is a block diagram of an integrated circuit and a ready-only memory (ROM) to store a unique ID on a common die. Integrated circuit 210 can be any type of circuit that provides functionality in addition to encryption/decryption and an interface to the storage device as described herein. Integrated circuit 210 causes encrypted data to be used by the personal audio/video system to be stored on a storage device.

Encryption is provided by using the unique ID 225, which is transferred from the ROM to the IC whenever required. This interface for the transfer of the ID is buried in the die and is not easily accessible. In one embodiment, unique ID 225 is used as a private key to be used in Triple DES or AES encryption algorithms. In alternate embodiments, other encryption algorithms and/or multiple IDs can be used. In one embodiment, ID 225 is unique among all personal audio/video devices. In an alternate embodiment, ID 225 is not absolutely unique, but sufficiently unique that the likelihood of two systems having the same ID interact is acceptably low.

In the embodiment of FIG. 2a, unique ID 225 is programmed and maintained at die fabrication time. This is a very secure implementation because unique ID 225 is not accessible from outside package 200. However, using current manufacturing processes, the embodiment of FIG. 2a is complex because the manufacturing of ROM and the IC may require different poly processes. Furthermore, the manufacturing yield of such a composite die may be low using current technology. Notwithstanding the manufacturing complexities, the embodiment of FIG. 2a provides a very secure implementation of unique ID per IC.

Figure 2B:
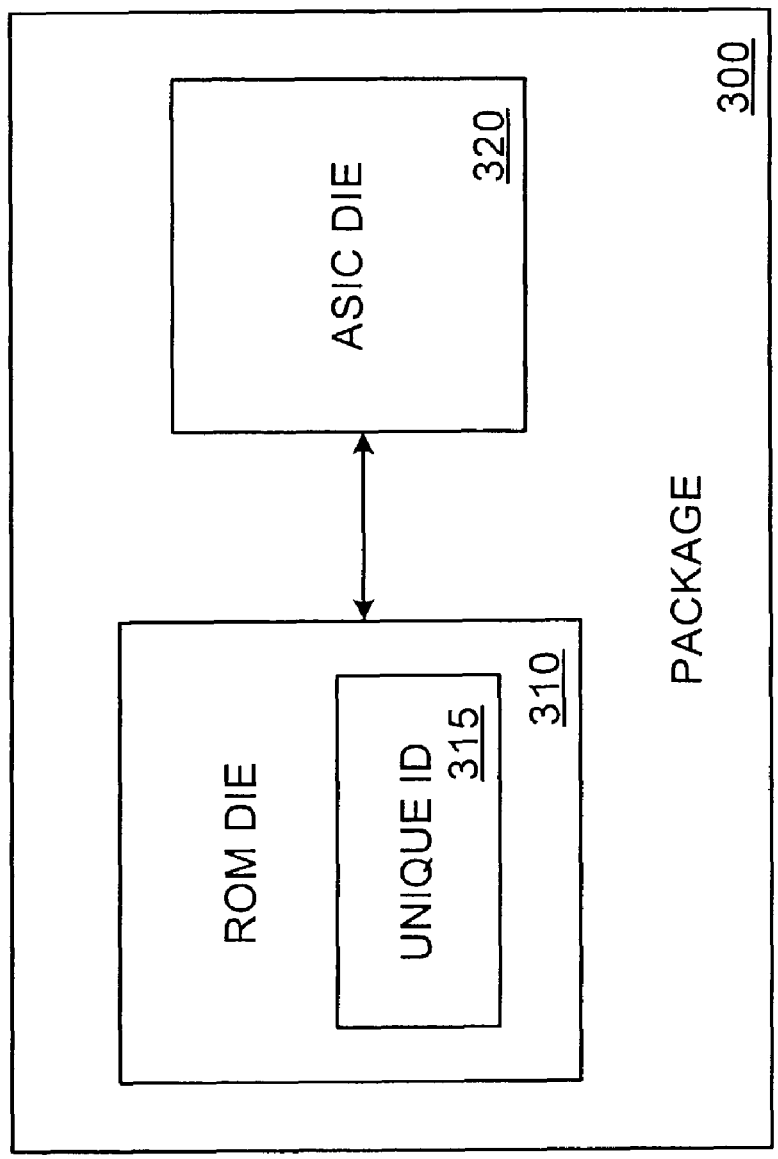
FIG. 2b is a block diagram of an integrated circuit and a read-only memory to store a unique identifier on different die in a single package.

FIG. 2b is a block diagram of an integrated circuit and read-only memory to store a unique identifier on different die in a single package. The interface between the ASIC and the ROM is hidden inside the package. In one embodiment, ROM die 310 is manufactured to include unique ID 315 using a manufacturing process independent of the ASIC die 320. Both dies are enclosed in a single package 300.

Unique ID 315 is programmed during the manufacture of ROM die 310. The embodiment of FIG. 2b provides good security; however it is less secure than the embodiment of FIG. 2a. The manufacturing of the two dies using different process is less complex than the embodiment of FIG. 2a because process can be separated and functional die from each process can be packaged together.

The embodiment of FIG. 2b may require more complex and more expensive packaging than the embodiment of FIG. 2a and the testing cost of the embodiment of FIG. 2b may be relatively high.

Figure 2C:
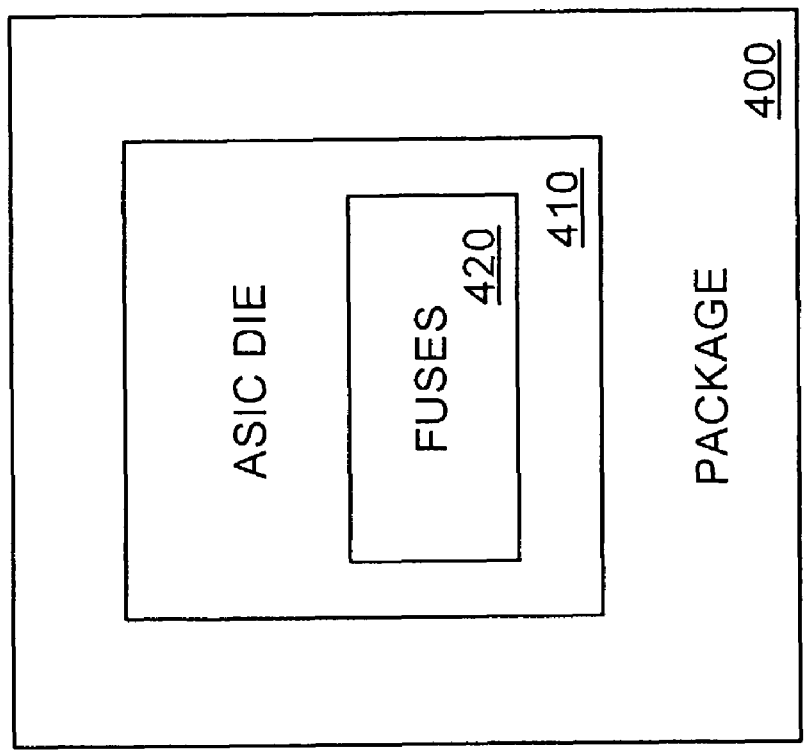
FIG. 2c is a block diagram of an integrated control circuit having a unique identifier stored in an array of fuses on the integrated circuit.

FIG. 2c is a block diagram of the unique ID stored in an array of fuses within the integrated circuit. ASIC die 410 is manufactured with an array of fuses 420 which are later appropriately blown to program an appropriate value. The fuses can be set, for example, by burning the fuses with a laser. The implementation of unique ID in the embodiment of FIG. 2c is very secure.

This implementation of unique ID would require custom design of the fuse cell arrays. Manufacturing is complex using current technology because the barrier metal of the fuse array is difficult to blow reliably. The embodiment of FIG. 2c would also be difficult to test during manufacturing because the fuse array does not store the unique ID until after the fuses are blown.

Figure 2D:
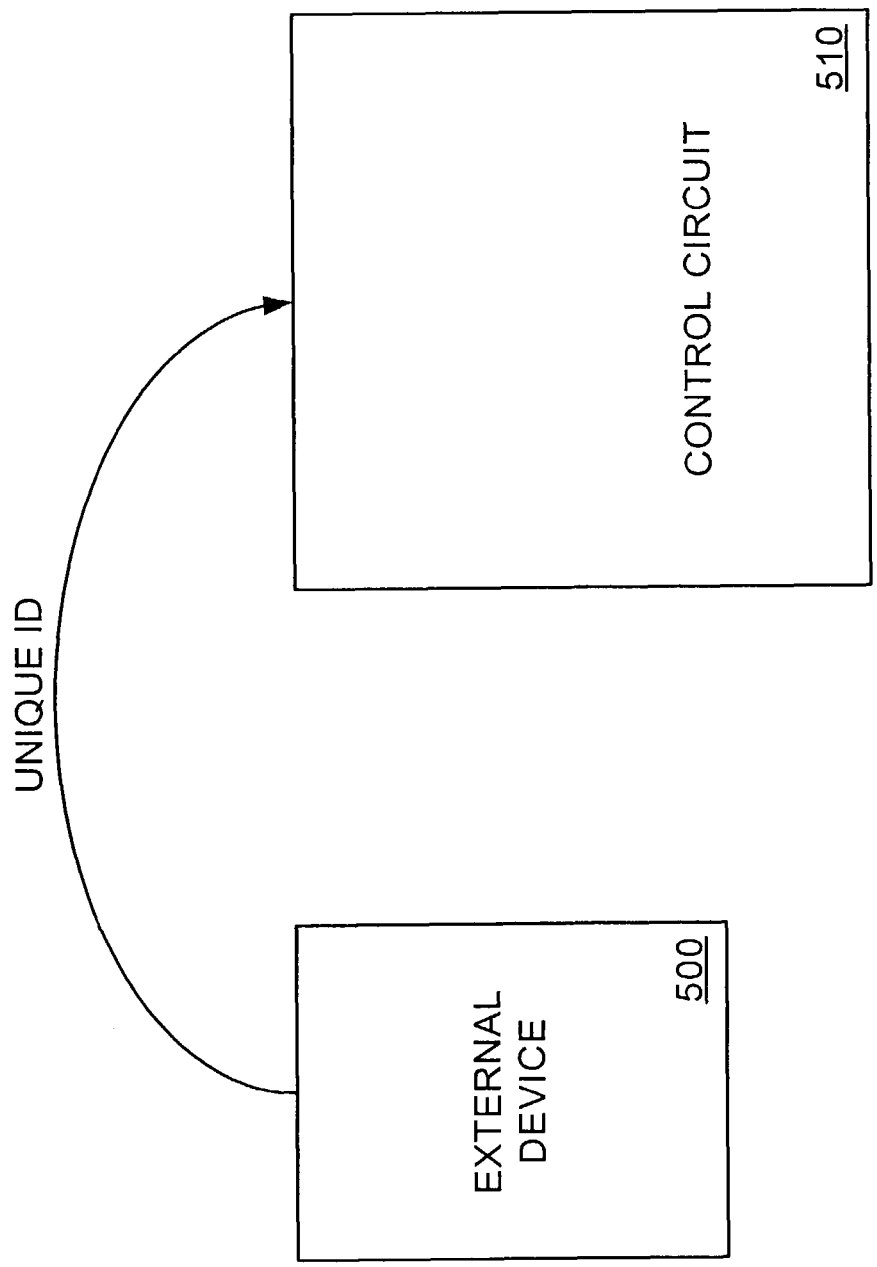
FIG. 2d is a block diagram of the implementation of unique ID in which the integrated circuit obtains the ID from an external source.

FIG. 2d is a block diagram of an integrated circuit obtaining the unique ID from an external device 500. In the embodiment of FIG. 2d, device 500 provides the unique ID to control circuit 510 over an interface, which uses this unique ID as described above.

External device 500 may be a standard or a proprietary one and is connected to the control circuit 510 using any appropriate interconnection scheme, whether proprietary or standard. For example, an I2C bus can be used, an ISO 7816-3 interface, or a SCSI Parallel Interface (SPI)-type link can be used. The I2C (Inter-IC) bus is a bi-directional two-wire serial bus that commonly used to provide a communication link between integrated circuits. Specifications and products related to the I2C bus are available from Phillips Corporation. There are three data transfer speeds for the I2C bus: standard, fast-mode, and high-speed mode. Standard is 100 kbps. Fast-mode is 400 kbps, and high-speed mode supports speeds up to 3.4 Mbps.

The ISO 7816 interface is described in detail in a document entitled "Integrated circuit(s) cards with contacts—Part 3: Electronic signals and transmission protocols," published by the International Organization for Standardization as document number 7816-3 in December 1997. One embodiment of a SPI is described in detail in the SCSI specifications available from IEEE.

Because the movement of the unique ID is in the clear, the embodiment of FIG. 2d suffers from the disadvantage that it is vulnerable to attacks against the interface between external device 500 and control circuit 510. Such attacks can be reduced by burying the traces of the interface during board design with these components, and choosing appropriate packaging techniques for components 500 and 510, particularly for the pins corresponding to the interface. However, the embodiment of FIG. 2d provides the advantage that little or no custom manufacturing and/or reliability testing is required.

Figure 2E:
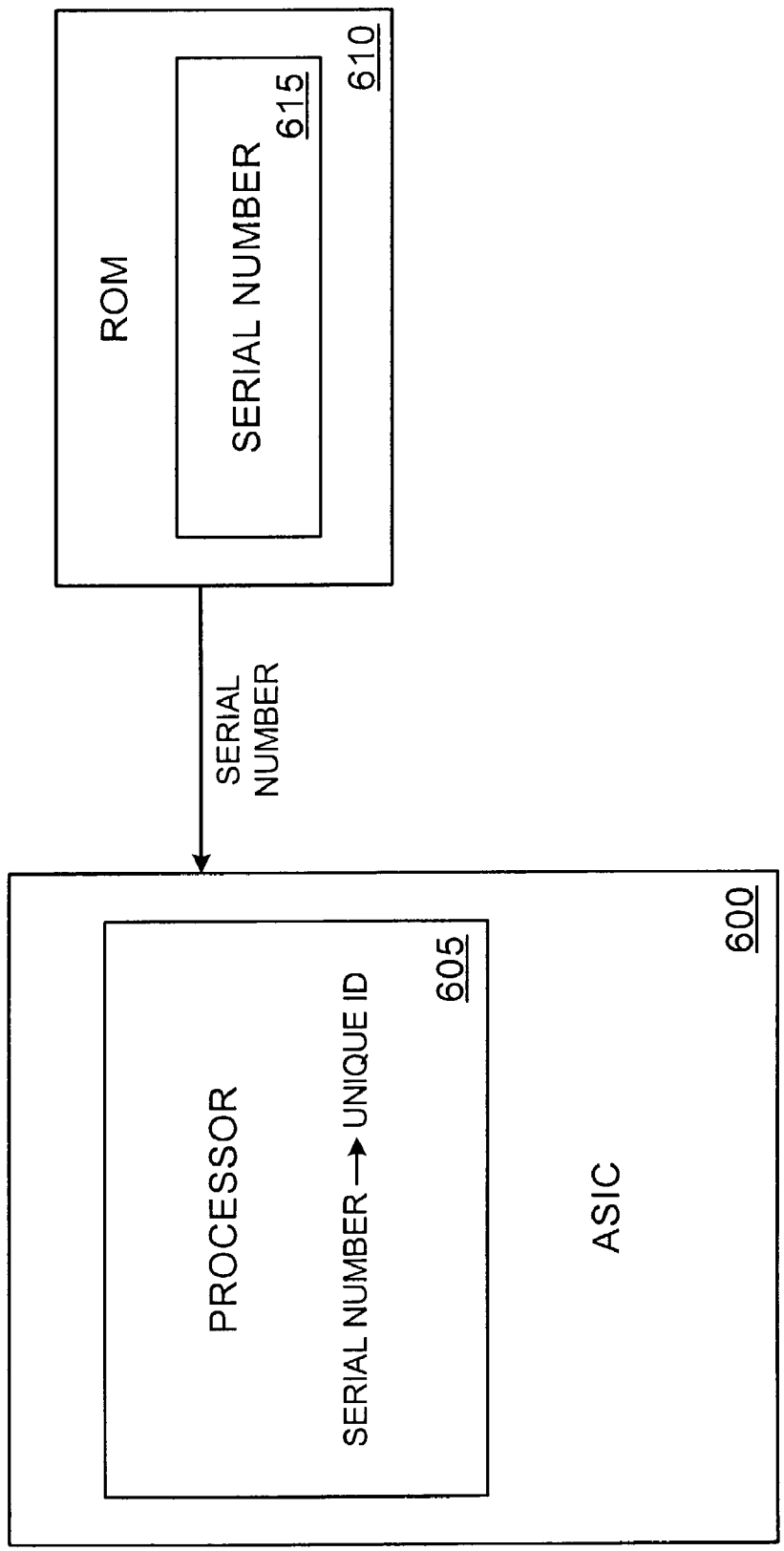
FIG. 2e is a block diagram of an integrated circuit that derives a unique ID from a system value.

FIG. 2e is a block diagram of a scheme in which the integrated circuit derives the unique ID from a system value. The system value can be, for example, a serial number fro either a hardware component of the system or from a software application installed on the system.

In the embodiment of FIG. 2e, ROM 610 includes serial number 615 or other ID that is used to generate a unique ID to be used as described above. ROM 610 provides serial number 615 to ASIC 600, which includes processor 605. Processor 605 generates the unique ID from the serial number. The unique ID can be generated, for example, by using a hash function on the serial number to generate a different number to be used as the unique ID.

The disadvantage of the embodiment of FIG. 2e is that serial numbers are typically shorter (e.g., 32 bits) than the desired keys lengths for the encryption/decryption algorithm (e.g., 128 bits). The security of the system hinged on keys derived from shorter serial numbers or other system values is typically less. However, most systems have multiple serial numbers that are unique IDs for components of the system. A combination of these serial numbers can be employed o make the relatively inexpensive embodiment of FIG. 2e a secure enough scheme of implementing unique ID.

Figure 2F:
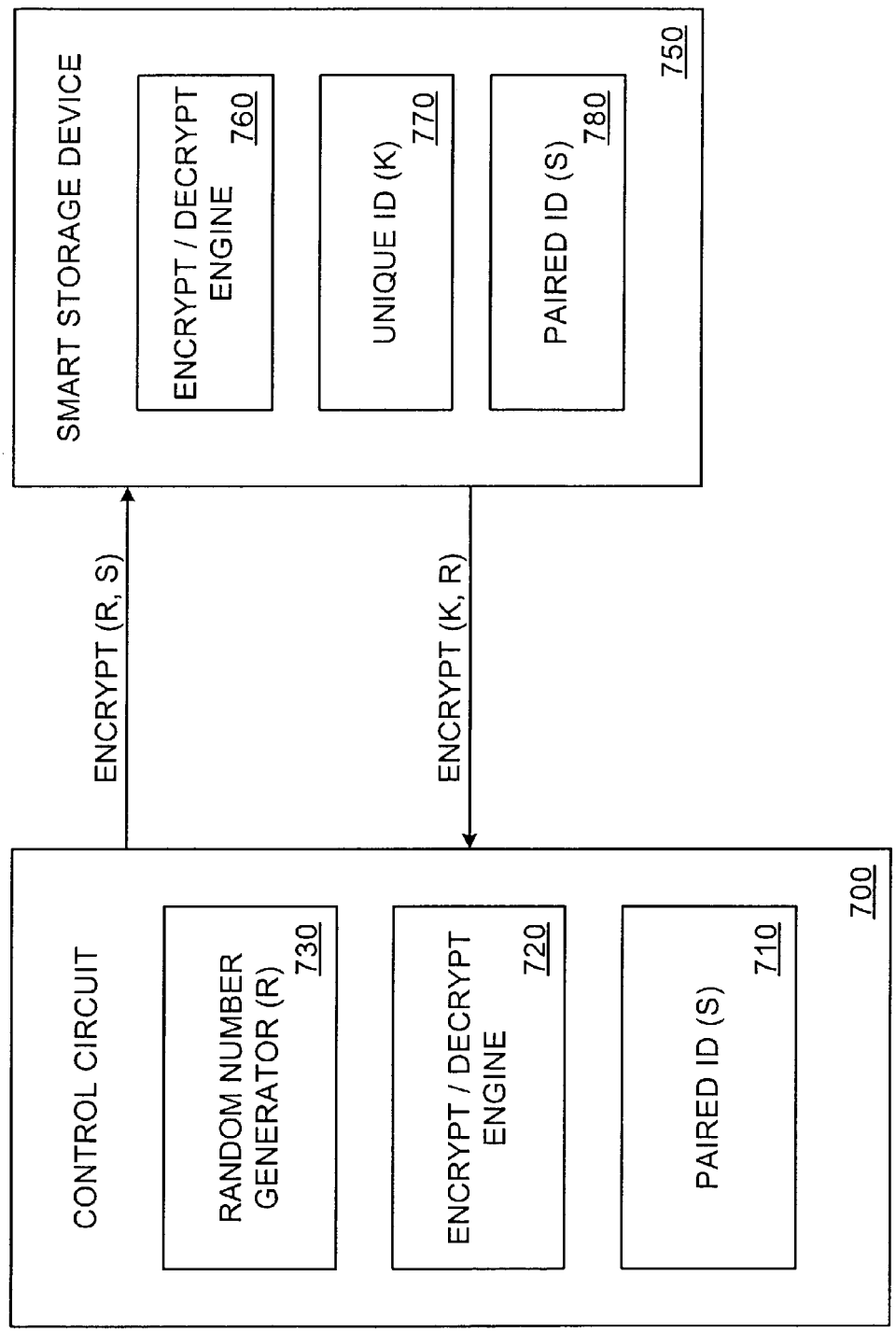
FIG. 2f is a block diagram of an integrated circuit that obtains a unique ID from an external smart device.

FIG. 2f is a block diagram that illustrates a secure scheme of transferring the unique ID from an external "smart" device to the control circuit. To avoid attacks on the interface between control circuit 700 and "smart" storage device 750, the unique ID itself is encrypted and only then transferred on the interface by the following scheme, as an example. Control circuit 700 is coupled with "smart" storage device 750, which includes an encrypt/decrypt engine 760. In one embodiment, engine 760 is a Triple-DES encryption/decryption engine; however, other encryption techniques known in the art, for example, AES can be used. The two devices (700 and 750) share a common secret (i.e., the paired ID, S) that is used to protect the movement of the unique ID, K, from the storage device 750 to the control circuit 700, This common secret could be programmed, at system-install time by, for example, the content provider. The weak point in the embodiment of FIG. 2f is this shared secret, but not the unique ID itself.

In one embodiment, the connection between storage device 750 and control circuit 700 complies to a standard interface known in the art, for example, I2C, ISO7816-3 or SPI. In alternate embodiments, other standard interfaces or a proprietary interface can be used.

Control circuit 700 includes encrypt/decrypt engine 720 that operates using the same encryption technique as engine 760 of device 750. In one embodiment, engine 720 of control circuit 700 is implemented as hardware and engine 760 of storage device 750 is implemented as micro-controlled firmware. In alternate embodiments, any combination of hardware and/or firmware implementations can be used. Control circuit 700 also includes random number generator 730 that generates random number (R). Any random number generator known in the art can be used.

Control circuit 700 and storage device 750 share a common secret number (S), which is stored in the control circuit (ID 710) as well as the "smart" storage device (ID 780). In one embodiment, the number S is a 64-bit number; however, any size can be used. As described in greater detail below, storage device 750 provides an encrypted copy of unique ID (K) 770 to the control circuit 700, thereby making the transfer of the unique ID secure. Control circuit 700 then uses this unique ID 770 to encrypt A/V data as described above.

One embodiment of a technique for secure transfer of the unique ID 770 to control circuit 700 is described. Variations of the technique can also be used. On boot-up, control circuit 700 generates a random number (R) using the random number generator 730. This random number is encrypted using the paired ID (S) 710 with the encrypt/decrypt engine 720 and is transmitted to the device 750. Device 750 then decrypts random number, R, with encrypt/decrypt engine 760 and using the paired ID, S. Then "smart" storage device 750 encrypts unique ID (K) 770 with encrypt/decrypt engine 760 and using the random number R before sending it to control circuit 700. Control circuit 700 decrypts the unique ID, K, using encrypt/decrypt engine 720 and the random number R. It must be noted that since random numbers are used, the transfer of unique ID over the interface will look different to a hacker every time its transferred at the beginning of a session.

Figure 3A:
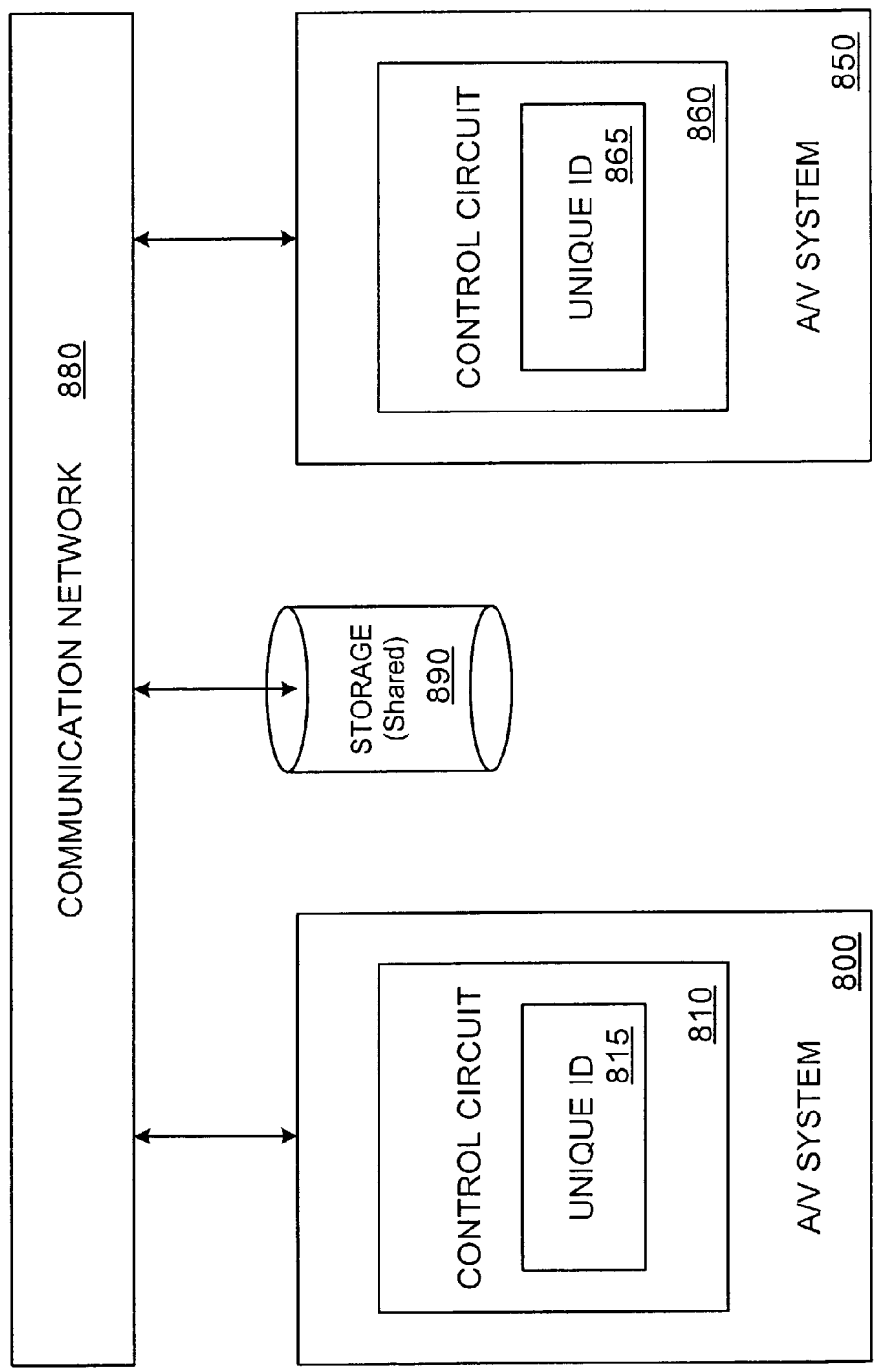
FIG. 3a is a block diagram of multiple personal audio/video systems sharing a common storage.

FIG. 3a is a block diagram of multiple personal audio/video systems sharing a storage device. It is illustrated how unique ID can be useful in preventing unauthorized content sharing, despite the storage being shared by the two systems. This system interconnection, as illustrated in FIG. 3a, may occur, for example, in a home where multiple family members have personal audio/video systems and share a common storage (e.g., a server, a network interface, a hard disk, a removable storage medium alternately used by multiple devices).

Communications network 880 couples storage device 890 with A/V system 800 and A/V system 850. Communications network 880 can be any type of medium, whether wired or wireless, capable of communicating data between electronic devices. For example, communications network 880 can be one or more network cables, or communications medium can be one or more wireless network devices (e.g., IEEE 802.11 wireless LAN, HomeRF, Bluetooth). Any number of storage devices and/or A/V systems can be coupled with the communications network 880.

Storage device 890 can be any type of storage device capable of storing A/V content, whether fixed or removable. Storage device 890 can be part of a larger system, (e.g., a server) or storage device 890 can be a stand-alone storage device.

A/V system 800 includes control circuit 810 and unique ID 815. The implementation of control circuit 810 and unique ID 815 can be any of the configurations described above. A/V system 800 can also include components addition to those illustrated in FIG. 3*a*. A/V system 800 is coupled to communication using communications network 880, for example, via a network interface card (not shown in FIG. 3*a*) or any other appropriate component.

Similarly, A/V system 850 includes control circuit 860 and unique ID 865. The implementation of control circuit 860 and unique ID 865 can be any of the configurations described above. A/V system 850 can also include components in addition to those illustrated in FIG. 3*a*. A/V system 850 is coupled to communicate using communications network 880, for example, via a network interface card (not shown in FIG. 3*a*) or any other appropriate component.

A/V system 880 and A/V system 850 can operate independently to record, playback, store, and/or otherwise use A/V data. When the A/V content is to be stored on shared storage 890 in a secure manner, the unique IDs of each A/V system are used to encrypt the content before writing out to storage 890. In a simple embodiment, A/V system 800 and A/V system 850 do not share encrypted data stored on storage device 890. In other words, content stored by A/V system 800 is not usable by A/V system 850 because A/V system 850 does not have access to the unique ID 815.

In more sophisticated embodiments, A/V system 800 and A/V system 850 are capable of sharing encrypted data stored on storage device 890. For example, ID 815 and ID 865 can be the same number (thereby not being unique), or techniques can be used whereby unique IDs can be shared between A/V system 800 and A/V system 850.

Figure 3B:
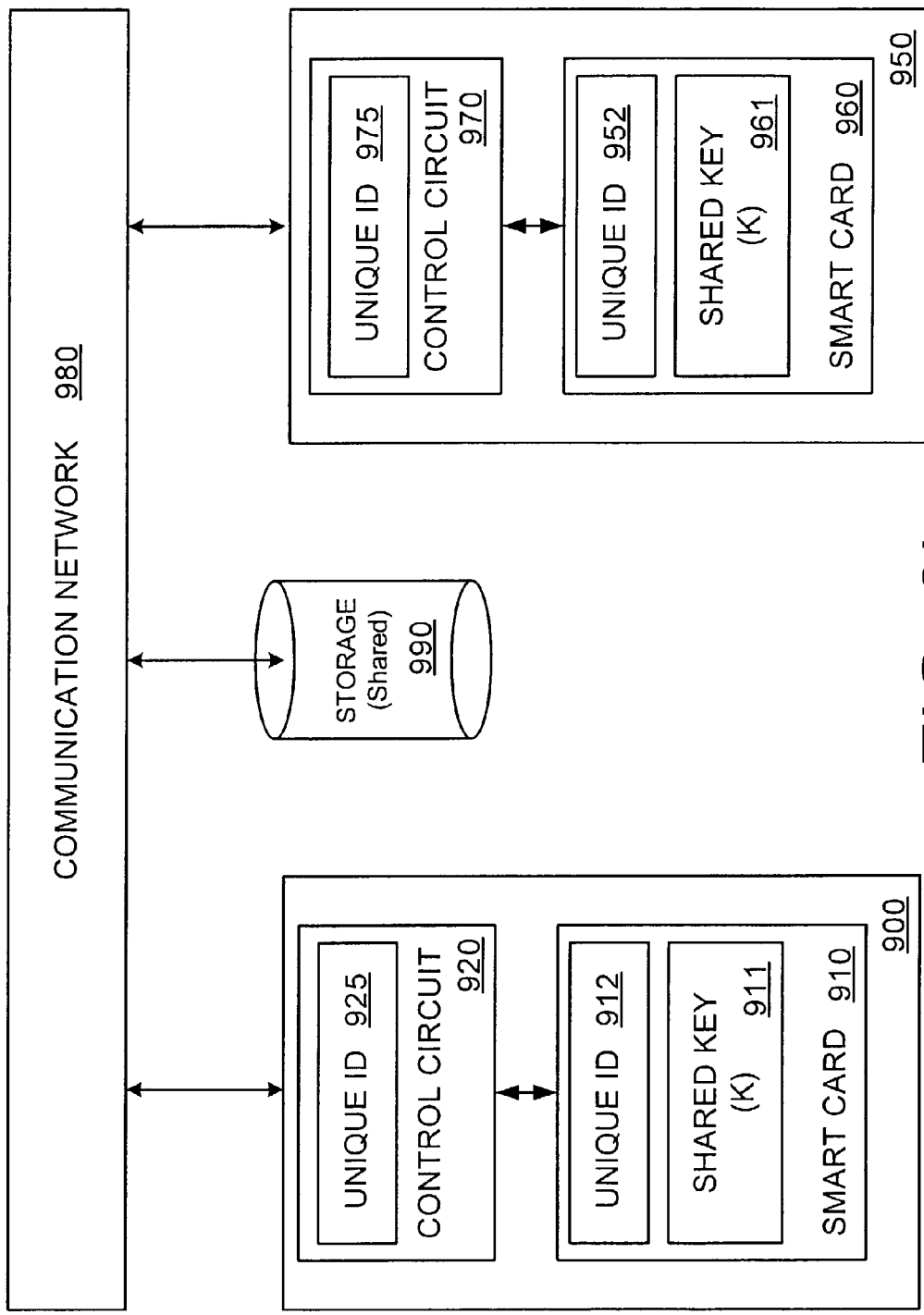
FIG. 3b is a block diagram of multiple personal audio/video systems sharing a common storage and using smart media to authorize encryption and decryption.

FIG. 3*b* is a block diagram of multiple personal audio/video systems sharing a storage device and using smart media to authorize encryption and decryption. It is illustrated how unique ID can be employed to facilitate content sharing securely. As described above, communications network 980 and storage device 990 can be any type of communications medium and storage device, respectively. Also, any number of A/V systems and storage devices can be supported. One of the things that scheme of content sharing is hinged on is the smart-cards, that under the control of content provider is required to issue shared/family key(s) dynamically. For example, in the embodiment of FIG. 3*b* the content sharing is facilitated by the shared key (K) that both smart-cards 910 and 960 are capable of sending to their paired control circuits 920 and 970, respectively. It is the interface between the control circuit and the smart card in these two systems that then becomes the weak point of the scheme. In the scheme illustrated below this interface is protected by using the unique ID of the corresponding control circuit.

A/V system 900 includes control circuit 920 which in turn contains a unique ID 925. The configuration of control circuit 920 and unique ID 925 can be any of the configurations described above. In one embodiment, A/V system 900 also includes an interface to communicate with the smart card 910. The smart-card is programmed at install time with ID 912 same as that of the control circuit. Under the control of the content provider the smart-card is capable of issuing shared key, K, 911 common among a group of systems.

Smart card 910 is coupled with integrated circuit 920 via a secure link. The secure link can be any type of secure communications path between smart card 910 and integrated circuit 920, for example, the secure links described above. In one embodiment, the shared key, K, passed over the secure link from smart card 910 to control circuit 920 and is encrypted using unique ID 912, that is, "Encrypt (K, UID912)".

By passing the shared key to control circuit 920 sing the unique ID 912, the shared key 911 can be then used to encrypt the content before storing it on the shared storage device 990.

Once control circuit 920 obtains the shard key, control circuit 920 stores the shared key in some internal registers or memory such that the shared key is not easily accessible to an unauthorized part, thereby maintaining the security of the encrypted data.

Likewise, A/V system 950 includes control circuit 970 with a unique ID 975 that is paired with a smart-card 960 containing the same unique ID 952. The configuration of control circuit 970 and unique ID 975 can be any of the configurations described above. In one embodiment, A/V system 950 also includes an interface to communicate with the smart card 960, which is programmed with the unique ID 952 same as that of the control circuit 970. In an alternate embodiment, another type of media other than a smart card can be used to store unique ID 952.

In one embodiment, smart card 960 is coupled with control circuit 970 via a secure link. The secure link can be type of secure communications path between smart card 960 and control circuit 970, for example, the secure links described above. In one embodiment, shared key (K) 961 is passed over the secure link from smart card 960 to control circuit 970 and is encrypted using unique ID 952 that is "Encrypt(K, UID952)".

Content communicated between A/V system 900 and storage device 990 as well as between A/V system 950 and storage device 990 is encrypted using the shared key, that is ("E(content,K)"). Furthermore, every movement of keys across two components is protected by suitable encrypting the value with the unique ID. Content stored on storage device 990 is encrypted using K. Since both A/V systems 900 and 950 have a copy of K, any content stored on the shared storage 990 and encrypted using K can be used by both A/V systems 900 and 950.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarding in an illustrative rather than a restrictive sense.

What is claimed is:

1. An audio/video system comprising:
a communications medium; and
a control circuit coupled with the communications medium, the control circuit to send and retrieve encrypted audio/video content to and from a storage device, wherein the control circuit shares an integrated circuit package with a programmable static memory to store an ID that is both associated with the audio/video system and is directly used by the control circuit as a key to perform encryption and decryption cryptographic operations on audio/video content to be stored on and audio/video content retrieved from the storage device, wherein the control circuit derives the ID from a combination of at least one system value of one or more hardware components of the audio/video system and at least one system value of one or more software components of the audio/video system.

2. The audio/video system of claim 1 further comprising an interface between the control circuit and a removable medium paired with the control circuit and having stored thereon the ID, the removable medium to provide another key directly encrypted using the ID to the control circuit, wherein the control circuit, after receiving the other key, decrypts the key directly using the ID and uses the key to encrypt content to be stored on the storage device.

3. The audio/video system of claim 1 wherein the control circuit and the programmable static memory are manufactured on a common die.

4. The audio/video system of claim 1 wherein the control circuit and the programmable static memory are manufactured on different die.

5. The audio/video system of claim 1 wherein the communications medium is secure.

6. The audio/video system of claim 1 wherein the programmable static memory is an electrically erasable programmable read-only memory (EEPROM).

7. An audio/video system comprising:
a communications medium; and
a control circuit coupled with the communications medium, the control circuit to send and retrieve encrypted audio/video content to and from a storage device, wherein the control circuit derives an ID associated with the audio/video system from a combination of a number assigned to a first system value of at least one hardware component in the audio/video system and a number assigned to a second system value of at least one software component in the audio/video system, the control circuit is included within one integrated circuit package, and wherein the ID is directly used by the control circuit as a key to perform encrypt and decrypt cryptographic operations on audio/video content to be stored on and audio/video content retrieved from the storage device.

8. The audio/video system of claim 7 further comprising an interface between the control circuit and a removable medium paired with the control circuit and having stored thereon the ID, the removable medium to provide another key directly encrypted using the ID to the control circuit, wherein the control circuit, after receiving the other key, decrypts the key directly using the ID and uses the key to encrypt content to be stored on the storage device.

9. The audio/video system of claim 7 wherein the number assigned to the first system value comprises one or more serial numbers associated with hardware components of the audio/video system.

10. The audio/video system of claim 7 wherein the number assigned to the second system value comprises one or more serial numbers associated with software components of the audio/video system.

11. A method comprising:
receiving audio/video content at an audio/video system over a computer network from a source external to the audio/video system;
encrypting the content in the audio/video system based on an encryption ID that is directly used as a key by a cryptographic engine within the audio/video system, wherein the encryption ID is based on an identifier assigned to and derived from a combination of a system value of at least one hardware component of the audio/video system and a system value of at least one software component of the audio/video system, wherein a device that stores the encryption ID shares an integrated circuit package with the cryptographic engine;

storing the encrypted content in a non-volatile data storage device in the audio/video system, such that the content can only be decrypted and played by said audio/video system or another system with which said encryption ID is shared for direct use as the key for decryption operations;
retrieving the encrypted content from the non-volatile data storage device;
using the cryptographic engine to directly employ the encryption ID as the key to decrypt the retrieved content within the audio/video system; and
playing the decrypted content on the audio/video system.

12. A method according to claim 11, characterized in that the identifier assigned to said one hardware component of the audio/video system is indicated by a plurality of fuses.

13. A method according to claim 11, characterized in that the identifier assigned to said one hardware component of the audio/video system is stored on a programmable static memory.

14. A method according to claim 13, characterized in that the programmable static memory is an electrically erasable programmable read-only memory (EEPROM).

15. A method according to claim 11, further comprising receiving from a removable medium a key encrypted using the encryption ID; decrypting the key; and
using the key to encrypt content to be stored on the non-volatile data storage device.

16. A method according to claim 11, characterized in that the audio/video content is received over a secure communications medium.

17. An audio/video system comprising:
a network interface configured for receiving audio/video content at an audio/video system from a source external to the audio/video system;
a cryptographic engine within the audio/video system, configured for encrypting the content in the audio/video system based on an encryption ID that is directly used as a key, and for decrypting the retrieved content for playback within the audio/video system based on the encryption ID that is directly used as the key, wherein the encryption ID is based on an identifier assigned to and derived from a combination of a system value of at least one hardware component of the audio/video system and an identifier assigned to and derived from a system value of at least one software component of the audio/video system, wherein a device that stores the encryption ID shares an integrated circuit package with the cryptographic engine;
a non-volatile data storage device configured for storing the encrypted content in the audio/video system, such that the content can only be decrypted and played by said audio/video system or another system with which said encryption ID is shared; and
a control circuit interface configured for retrieving the encrypted content from the non-volatile data storage device.

18. An audio/video system according to claim 17, characterized in that the identifier assigned to said one hardware component of the audio/video system is indicated by a plurality of fuses.

19. An audio/video system according to claim 17, characterized in that the identifier assigned to said one hardware component of the audio/video system is indicated by a programmable static memory.

20. An audio/video system according to claim 19, characterized in that the programmable static memory is an electrically erasable programmable read-only memory (EEPROM).

21. An audio/video system according to claim 17, further comprising a removable medium configured for providing a key encrypted using the encryption ID;
characterized in that the encryption engine decrypts the key; and the encryption engine uses the key to encrypt content to be stored on the non-volatile data storage device.

22. An audio/video system according to claim 17, characterized in that the audio/video content is received over a secure communications medium.

23. An audio/video system comprising:
a communications medium; and
a control circuit coupled with the communications medium, the control circuit to send and retrieve encrypted audio/video content to and from a storage device, wherein the control circuit derives an ID associated with the audio/video system as a combination of at least two of a plurality of serial numbers associated with a plurality of components in the audio/video system,
wherein the combination of at least two serial numbers for the plurality of components comprise at least one software component and at least one hardware component, wherein the control circuit is included on one integrated circuit package, and wherein the ID is directly used as a key by the control circuit to perform encrypt and decrypt cryptographic operations on audio/video content to be stored on and audio/video content retrieved from the storage device.

24. The audio/video system of claim 23 further comprising an interface between the control circuit and a removable medium paired with the control circuit and having stored thereon the ID, the removable medium to provide another key directly encrypted using the ID to the control circuit, wherein the control circuit, after receiving the other key, decrypts the key directly using the ID and uses the key to encrypt content to be stored on the storage device.

25. An audio/video system comprising:
a network interface configured for receiving audio/video content at an audio/video system from a source external to the audio/video system;
a cryptographic engine within the audio/video system, configured for encrypting the content in the audio/video system based on an encryption ID that is directly used as a key for decrypting the retrieved content for playback within the audio/video system based on directly using the encryption ID as the key for decryption, wherein the encryption ID is based on a combination of at least two of a plurality of serial numbers assigned to components of the audio/video system, wherein the combination of serial numbers assigned to the plurality of components comprise at least one software component and at least one hardware component, and wherein the encryption ID is stored on the same integrated circuit package as the cryptographic engine;
a non-volatile data storage device configured for storing the encrypted content in the audio/video system, such that the content can only be decrypted and played by said audio/video system or another system with which said encryption ID is shared for direct use as the key for decryption; and
a control circuit interface configured for retrieving the encrypted content from the non-volatile data storage device.

26. An audio/video system according to claim 25, further comprising a removable medium configured for providing a key encrypted using the encryption ID; characterized in that the encryption engine decrypts the key; and the encryption engine uses the key to encrypt content to be stored on the non-volatile data storage device.

27. An audio/video system according to claim 25, characterized in that the audio/video content is received over a secure communications medium.

* * * * *